(No Model.) 3 Sheets—Sheet 1.
T. E. LITTLEFIELD.
COMBINED ELEVATOR, CLEANER, DISTRIBUTER, AND FEEDER FOR SEED COTTON.
No. 517,980. Patented Apr. 10, 1894.
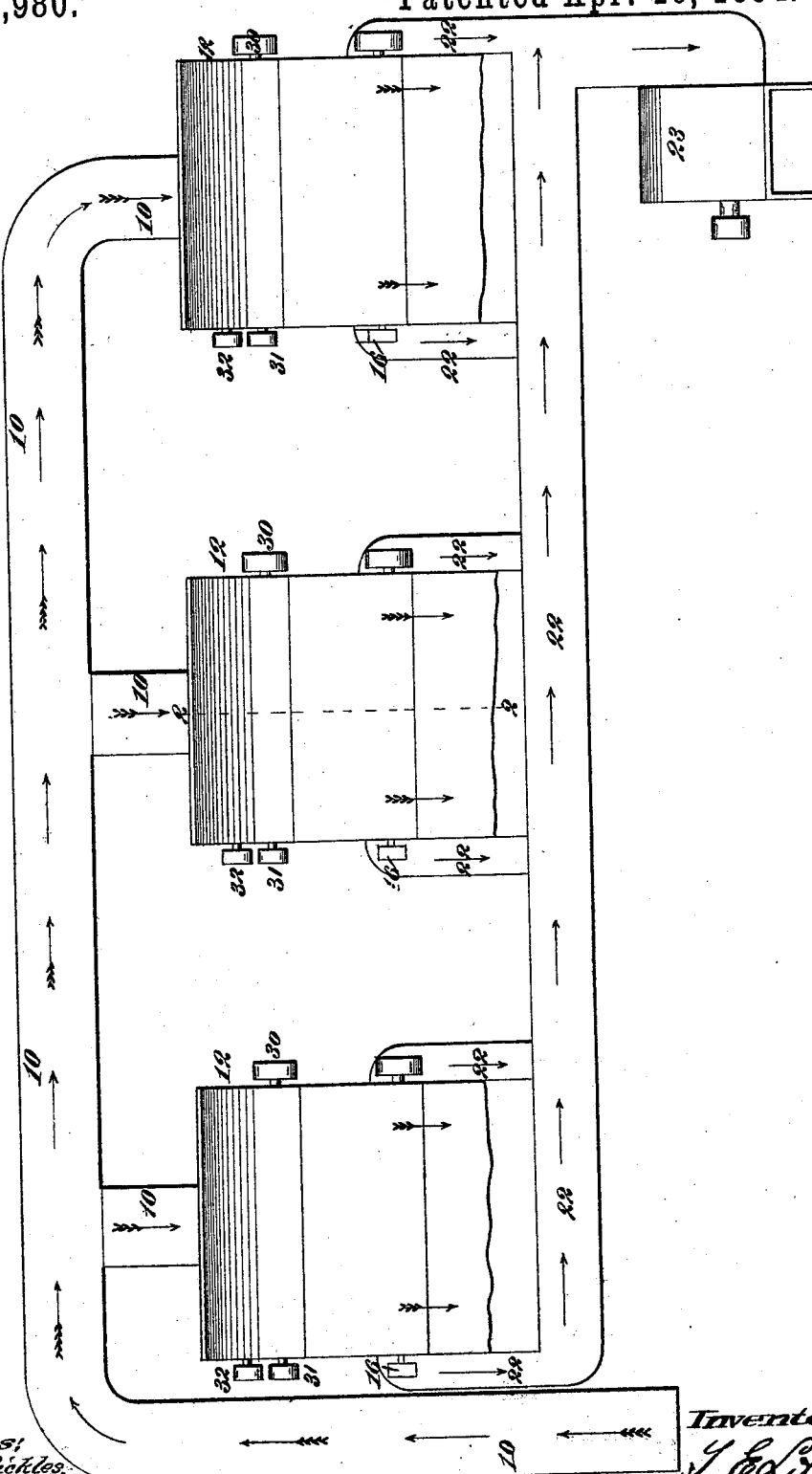

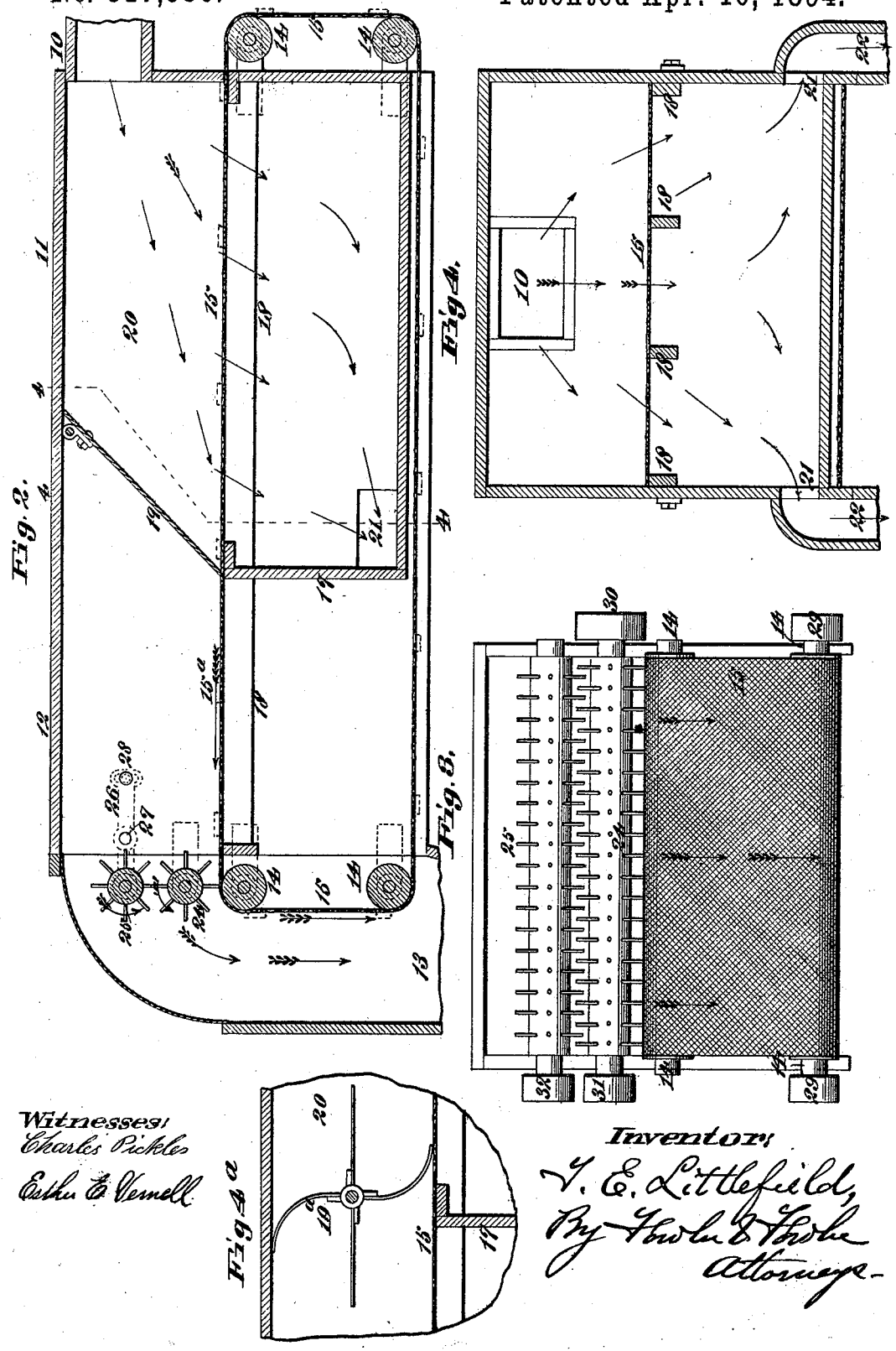

(No Model.) 3 Sheets—Sheet 3.

T. E. LITTLEFIELD.
COMBINED ELEVATOR, CLEANER, DISTRIBUTER, AND FEEDER FOR SEED COTTON.

No. 517,980. Patented Apr. 10, 1894.

Witnesses:
Charles Pickles
Walter D. Coles

Inventor:
T. E. Littlefield,
By Fowler & Fowler
Attorneys

UNITED STATES PATENT OFFICE.

THOMAS E. LITTLEFIELD, OF HILLSBOROUGH, TEXAS.

COMBINED ELEVATOR, CLEANER, DISTRIBUTER, AND FEEDER FOR SEED-COTTON.

SPECIFICATION forming part of Letters Patent No. 517,980, dated April 10, 1894.

Application filed June 26, 1893. Serial No. 478,823. (No model.)

*To all whom it may concern:*

Be it known that I, THOMAS E. LITTLEFIELD, a citizen of the United States, residing at Hillsborough, county of Hill, and State of Texas, have invented a certain new and useful Combined Elevator, Cleaner, Distributer, and Feeder for Seed-Cotton, of which the following is such a full, clear, and exact description as will enable any one skilled in the art to which it appertains to make and use the same, reference being had to the accompanying drawings, forming part of this specification.

The object of my invention is to provide a simple, cheap and efficient apparatus for taking seed cotton from a wagon, or other source of supply, cleaning it, and delivering it in the desired quantity and in a suitable condition for ginning to one or more gins or gin feeders.

The patentable novelty of my invention will be particularly pointed out in the description and claims, which follow.

My invention will be best understood by reference to the accompanying drawings, in which—

Figure 5:
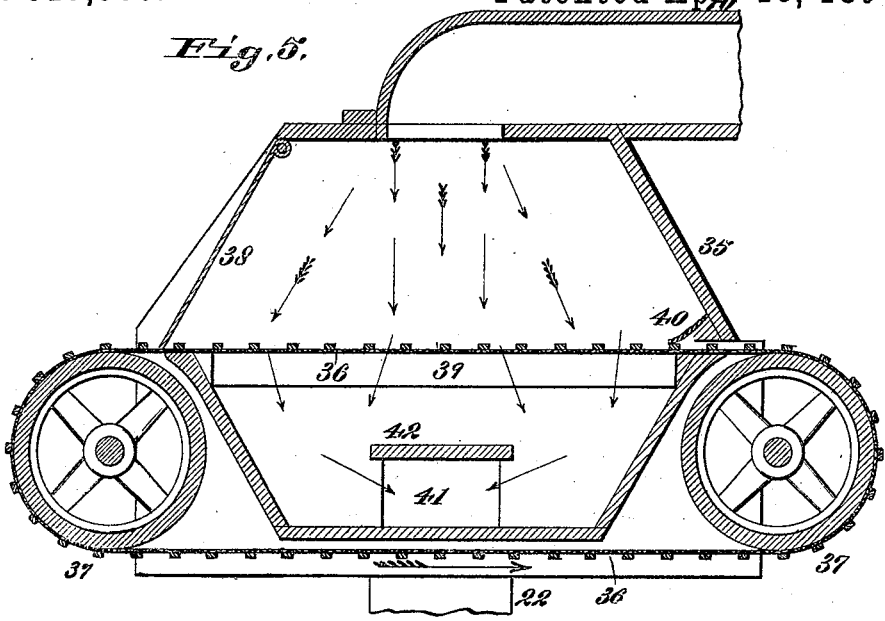
Figure 6:
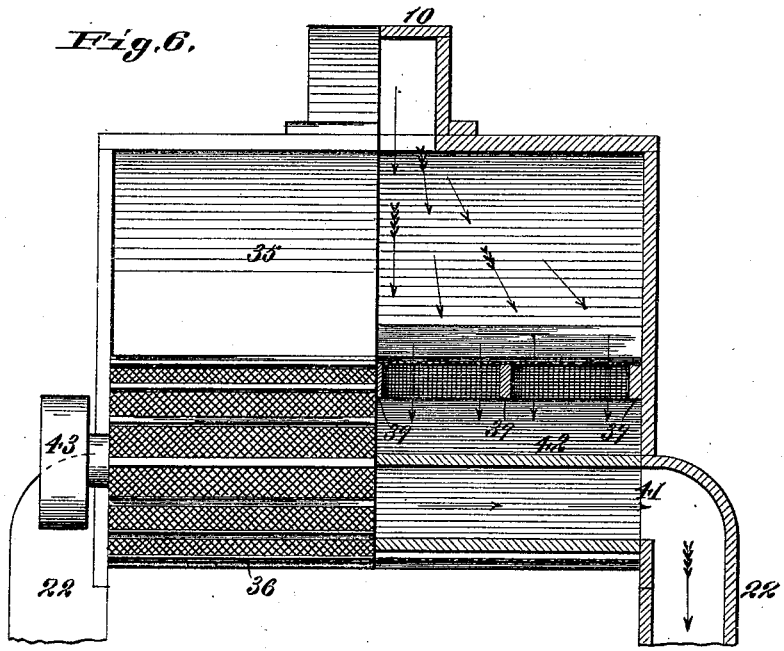

Figure 1 is a front elevation of one form of my apparatus, the same being adapted to deliver seed cotton to three gins or gin feeders. Fig. 2 is a longitudinal section of one of the receivers employed in my apparatus, taken on the line 2—2, Fig. 1. Fig. 3 is a front view of the receiver, the front casing being removed. Fig. 4 is a transverse section of the receiver on the line 4—4, Fig. 2. Fig. 4$^a$ is a transverse section of the receiver partly broken away showing a modification. Fig. 5 is a longitudinal section of a modified form of my apparatus. Fig. 6 is a front view, partly in elevation and partly in section, of the modified form shown in Fig. 5.

Referring to the accompanying drawings, in which the same marks of reference indicate the same parts throughout the several views: 10 is a trunk or tube through which the seed cotton passes. The trunk or tube 10 communicates with the wagon or bin which constitutes the source of supply of seed-cotton, either directly or by means of a suitable telescopic connection. The trunk 10 passes through the casing 11 into the receiver 12. The receiver 12 consists of a hollow box formed by the casing 11, the said box being provided near the front thereof with an opening 13 through which the seed-cotton passes to the gin or gin feeder.

Properly journaled in suitable bearings placed at the side of the receiver, are mounted the four rollers 14. Passing over and around the rollers 14 is the endless perforated apron or screen 15. One of the rollers 14 is provided with a driving pulley 16 (Fig. 3), which said driving pulley is adapted to be properly connected by a belt with the gin-shaft or other suitable source of power, and thus communicate motion to said rollers, thereby causing the perforated apron 15 to travel around said rollers. The four rollers 14 are so arranged that the perforated apron traveling around them will move through the receiver to a point near the discharge opening 13, then around the two rollers placed near the front of the receiver, from whence it will travel backward, preferably below the bottom casing of the receiver. Intermediate the ends of the receiver 12 is placed the transverse partition 17, the said partition 17 extending from the bottom of the casing 11 upward, and terminating at a point just below the line of travel of the perforated apron 15.

For the purpose of preventing the endless perforated apron 15 from sagging under the weight of the cotton carried thereby, I provide the supporting strips 18 extending longitudinally in the receiver, beneath the apron, the strips being suitably secured to and supported by the casing of the receiver.

To the upper wall or casing of the receiver is pivoted the valve or flap 19, the said valve or flap being adapted normally to extend downwardly and rest against the apron 15 just above the partition 17, but being capable of swinging upwardly from its normal position. I may, if desired, use in lieu of the hinged valve or flap 19 an ordinary winged valve 19$^a$ shown in Fig. 4$^a$, so mounted within the receiver that one of the wings or blades will always be in contact with the top casing of the receiver, and another always in contact with the perforated apron 15 at or near the point where it passes over the partition 17.

It will be seen that the hinged valve 19 and the partition 17 serve to inclose within one end of the receiver an air-tight chamber 20. The said chamber 20 communicates as before explained, through the trunk 10 to the wagon or other source of supply of seed-cotton, and also communicates through apertures 21 formed in the lower part of the casing 11 near the partition 17, with the trunks or tubes 22 which communicate with a fan or exhaust 23 (Fig. 1).

Above the perforated apron 15 near the front of the receiver 12, are placed the spiked rollers 24 and 25, which are mounted in bearings at the sides of the receiver. The roller 25 is journaled at each side of the receiver in pivoted arms 26 (Fig. 2), the said pivoted arms 26 being capable of oscillation about pivots 27, and being adapted to be secured in the desired position by means of set-screws 28, passing through slots formed in the ends of the arms 26. The purpose of having the roller 25 mounted in movable bearings is to permit of its being moved toward or away from the roller 24, so as to regulate the quantity of cotton that will be delivered from the receiver, as hereinafter explained.

The means by which motion is communicated to the several moving parts of my apparatus may be varied to suit the exigencies of any particular situation in which it may be designed to employ it, but I have shown in the drawings a practicable means of propelling the several moving parts. One of the rollers 14 carrying the perforated apron 15 has mounted upon its end, a driving pulley 16 which is propelled from any suitable source of power, as before described. The opposite end of the roller 14, upon which is mounted the driving pulley 16, is provided with a pulley 29. The pulley 29 propels, by means of a suitable belt, a pulley 30 mounted upon the spiked roller 24. Upon the opposite end of the spiked roller 24 is a pulley 31 adapted, in turn, to propel a second pulley 32 mounted upon the end of the spiked roller 25.

The operation of that form of my apparatus hereinbefore described, is as follows: The trunk 10 being in communication with the source of supply of seed-cotton, and the trunks 22 being in communication with the fan or exhaust 23, a draft of air will be created in the direction of the unfeathered arrows, through the said trunks and across the chamber 20 of the receiver 12. Said draft of air will operate to draw the cotton from the source of supply, through the trunk 10, and into the upper part of the chamber 20, where it will fall upon and be intercepted by the perforated apron 15. The seed-cotton being held down upon the perforated apron by virtue of suction created by the draft of air, will move along with the travel of said apron and be carried, as indicated by the feathered arrows, under the hinged valve 19. I preferably provide the perforated apron 15 with the transverse slats 15ª (Fig. 2), the draft of air serving to hold the cotton down upon the apron, and the slats carrying it along beneath the hinged valve 19. When the seed-cotton is carried along by the perforated apron to a point underneath the spiked roller 24, it will be caught up by said spiked roller 24 which rotates in the direction indicated in the drawing (Fig. 2) by the arrows, and will be carried upward between the roller 24 and the roller 25, and after passing between said rollers, will fall downward through the opening 13 and be deposited directly within the gin-breast or gin feeder, which may be placed immediately below the opening 13. The spiked rollers 24 and 25 co-operate to thoroughly loosen the seed-cotton and to disintegrate any compacted masses and at the same time, the upper roller 25 (which travels in the direction indicated by the arrow, Fig. 2) serves to beat back or remove from the lower roller 24 the excess of seed-cotton which may be carried thereby, thus serving to control the quantity of cotton delivered to the gin. The amount of cotton which the upper roller 25 will permit to pass can be regulated at pleasure by moving the said roller 25 toward or away from the roller 24, as hereinbefore explained.

Figs. 5 and 6 illustrate a modified form of my apparatus in which the cotton is delivered directly from the traveling apron into the gin feeder without the intervention of spiked feed rollers. Referring to those figures, the trunk 10 through which the seed-cotton passes from the bin or wagon, enters an air-tight box or receiver 35, across which travels a perforated slatted apron 36, said apron 36 passing around the rollers 37. The receiver 35 is provided at the front thereof, with the hinged flap or valve 38. The slatted apron 36 is supported by strips 39 placed within the receiver 35 below the travel of said apron.

In order to keep the receiver air-tight at the point where the apron 36 passes into the said receiver, I provide a flexible flap 40, which is suitably secured to the side wall of the receiver and is adapted to extend downwardly and come in contact with the said slatted apron. Beneath the slatted apron 36 the receiver 35 is provided with lateral apertures 41, into which pass trunks 22 communicating with a fan or exhaust. Transversely across the lower part of the receiver immediately above the lateral opening 41, is placed the board or partition 42, the purpose of which is to cause a better dispersion of the draft within the receiver 35. The rollers 37 are propelled by means of a pulley 43 mounted upon the shaft carrying one of said rollers.

Where the modified form of my apparatus just described is employed, seed-cotton enters the receiver through the trunk 10, as indicated by the fully feathered arrows in Figs. 5 and 6. The draft passes across the receiver as indicated in said figures by the unfeathered arrows.

The mode of operation of the modified form of my device is precisely similar to that hereinbefore described in connection with the preferred form, except that in the modified form I do not employ the spiked feed rollers hereinbefore described, but deliver the cotton directly from the traveling apron 36 into any proper gin feeder.

Having fully described my invention, what I desire to claim and secure by Letters Patent of the United States is—

1. An apparatus for handling seed cotton, consisting of a box or receiver, a trunk for delivering cotton to said box or receiver, a traveling screen moving within said box or receiver below the path of the cotton for delivering the cotton therefrom to a gin or feeder, appliances for creating a draft of air through said trunk, receiver and screen, a valve making air-tight connection with said screen, and means for propelling said traveling screen.

2. A seed-cotton handling apparatus, consisting of a box or receiver, a trunk for delivering the cotton to said box or receiver, a traveling screen, adapted to move within said box or receiver below the path of the cotton and carry the cotton forward, one or more spiked feed-rollers for delivering the cotton from the screen to a gin or gin feeder, appliances for creating a draft of air through said trunk, receiver and screen, and means for propelling the said traveling screen and the said feed-roller or rollers.

3. A seed-cotton handling apparatus, consisting of a trunk or tube, a box or receiver with which said trunk or tube communicates, a traveling screen adapted to move within said box or receiver below the path of the cotton, appliances for propelling said traveling screen, a pair of feed-rollers for delivering the cotton from the screen to a gin or gin feeder, a valve making air-tight connection with said screen, and means for creating a draft of air through said trunk or tube and across said box or receiver and said screen.

4. A seed-cotton handling apparatus, consisting of a trunk or tube, a box or receiver with which said trunk or tube communicates, a traveling screen adapted to move within said box or receiver, appliances for propelling said traveling screen, a pair of feed-rollers for delivering the cotton from the screen to a gin or gin feeder, means for adjusting said feed-rollers, and means for creating a draft of air through said trunk or tube and across said box or receiver.

5. A cotton handling apparatus, consisting of a trunk or tube, a box or receiver with which said trunk or tube communicates, a traveling screen, rollers journaled in bearings at the sides of the box or receiver and around which said screen travels, means for propelling said rollers, a partition extending from the bottom of said receiver or box to a point below the line of travel of said screen, a valve appliance secured to the upper part of said receiver and adapted to form with said partition a chamber, a trunk or tube communicating with said chamber below said screen, and means for creating a draft of air in said last-mentioned trunk or tube.

6. A cotton handling apparatus, consisting of a trunk or tube, a box or receiver with which said trunk or tube communicates, a screen placed within said box or receiver, a second trunk or tube communicating with said box or receiver below said screen, means for creating a draft of air through said last-mentioned trunk or tube, and a board or partition placed within said box or receiver above the aperture leading to the trunk or tube last mentioned, for causing a dispersion of the draft of air within said receiver.

In testimony whereof I have hereunto set my hand and affixed my seal, this 20th day of June, 1893, in the presence of the two subscribing witnesses.

T. E. LITTLEFIELD. [L. S.]

Witnesses:
  G. R. BENNETT,
  I. ROSENBAUM.